(12) United States Patent
Ban et al.

(10) Patent No.: US 6,557,502 B2
(45) Date of Patent: May 6, 2003

(54) VEHICLE AIR CONDITIONER WITH HEAT STORAGE TANK

(75) Inventors: Koichi Ban, Tokai (JP); Toshio Morikawa, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/213,981

(22) Filed: Aug. 7, 2002

(65) Prior Publication Data

US 2003/0037776 A1 Feb. 27, 2003

(30) Foreign Application Priority Data

Aug. 22, 2001 (JP) ............................ 2001-251889

(51) Int. Cl.⁷ ............................................. F01P 11/02
(52) U.S. Cl. ................................................. 123/41.14
(58) Field of Search ......................................... 123/41.14

(56) References Cited

U.S. PATENT DOCUMENTS 5,701,852 A * 12/1997 Suzuki et al. ............ 123/41.14
5,765,511 A * 6/1998 Schatz .................... 123/41.14
5,896,833 A   4/1999 Aoki ....................... 123/41.14
6,138,618 A * 10/2000 Genster ................... 123/41.14
6,178,929 B1 * 1/2001 Schatz .................... 123/41.14

* cited by examiner

*Primary Examiner*—Willis R. Wolfe
*Assistant Examiner*—Douglas A. Salser
(74) *Attorney, Agent, or Firm*—Harness, Dickey & Pierce, PLC

(57) ABSTRACT

In a water discharge mode (heat storage mode) for discharging low-temperature cooling water from a heat storage tank to a side of a heater core that heats air using cooling water from an engine as a heating source, a cooling water amount discharged from the heat storage tank is made smaller as a necessary heating capacity for heating air becomes larger. For example, as an amount of air flowing through the heater core becomes larger, the cooling water amount discharged from the heat storage tank becomes smaller. Further, as the temperature of the cooling water flowing into the heater core becomes higher, the cooling water amount discharged from the heat storage tank is increased.

12 Claims, 9 Drawing Sheets

VEHICLE AIR CONDITIONER WITH HEAT STORAGE TANK

CROSS REFERENCE TO RELATED APPLICATION

This application is based on Japanese Patent Application No. 2001-251889 filed on Aug. 22, 2001, the disclosure of which is incorporated herein by reference.

FIELD OF THE INVENTION

The present invention relates to a vehicle air conditioner with a heat storage tank in a cooling water circuit of an engine. The heat storage tank thermally-insulates and stores high-temperature cooling water in the cooling water circuit, for heating the engine.

BACKGROUND OF THE INVENTION

In a cooling water circuit described in U.S. Pat. No. 5,896,833, when an engine (i.e., internal combustion engine) starts operation, high-temperature cooling water stored in a heat storage tank is supplied to the engine, and low-temperature cooling water in the engine is stored in the heat storage tank, so that the heating capacity of the engine is improved while injurious ingredients contained in the exhaust gas are reduced. In the cooling water circuit, until the engine stops after engine-heating operation is performed, high-temperature water from the engine is introduced into the heat storage tank to be stored in the heat storage tank while low-temperature water in the heat storage tank is discharged to an outside of the heat storage tank. Accordingly, even when the temperature of cooling water (hot water) flowing from the engine is sufficiently increased after the engine-heating operation is finished, the temperature of cooling water flowing into a heater core may be decreased due to the low-temperature water discharged from the heat storage tank, and heating capacity of the heater core for heating air to be blown into a passenger compartment is decreased. Thus, air temperature heated by the heater core may be greatly reduced.

On the other hand, in a case where a vehicle is driven after being stopped for a long time, when the water stored in the heat storage tank is exchanged by high-temperature cooling water after the temperature of the engine-cooling water becomes higher, the temperature of cooling water flowing into the heater core may be decreased due to the low-temperature water discharged from the heat storage tank.

SUMMARY OF THE INVENTION

In view of the above-described problems, it is an object of the present invention to provide a vehicle air conditioner with a heat storage tank, which restricts an air temperature flowing from a heater core from being greatly reduced even when low-temperature water is discharged from the heat storage tank toward the heater core.

It is an another object of the present invention to effectively store high-temperature water in a water circuit of an engine without greatly reducing heating performance of the heater core for heating air, in a water circuit system.

According to the present invention, in an air conditioner for a vehicle having a water-cooled engine for driving the vehicle, a heater core is disposed in a water circuit for heating air to be blown into a passenger compartment of the vehicle by using the water from the engine as a heating source. A heating-amount adjustment unit is disposed to adjust the heating amount for heating air passing through the heater core. A heat storage tank is disposed for thermally-insulating and storing the introduced water from the water circuit. A water-amount adjustment unit is disposed to adjust the amount of water discharged from the heat storage tank and introduced into the heat storage tank. Finally a control unit controls the heating-amount adjustment unit and the water-amount adjustment unit. The control unit includes heating-capacity determining means for determining the heating capacity for heating air by the heater core, and discharge-amount controlling means for controlling the flow of the water discharged from the heat storage tank. In the air conditioner, when the heating-capacity determining means determines that the necessary heating capacity is smaller than a predetermined capacity during a water discharge mode for discharging the water from the heat storage tank toward the heater core, the discharge-amount controlling means controls the water-amount adjustment unit such that the flow of the water discharged from the heat storage tank becomes larger than that when the heating-capacity determining means determines that the necessary heating capacity is larger than the predetermined capacity. Accordingly, when the heating-capacity determining means determines that the necessary heating capacity is larger than the predetermined capacity in the water discharge mode, a small amount of low-temperature water, stored in the heat storage tank in a preheat mode for heating the engine using high-temperature water in the heat storage tank, flows into the heater core. Thus, the air temperature can be restricted from being greatly reduced. On the other hand, when the heating-capacity determining means determines that the necessary heating capacity is smaller than the predetermined capacity in the water discharge mode, a large amount of low-temperature water, stored in the heat storage tank in the preheat mode, flows toward the heater core. Accordingly, high-temperature water in the water circuit can be rapidly stored in the heat storage tank. Thus, the high-temperature water in the water circuit of the engine can be effectively stored in the heat storage tank without greatly reducing heating performance of the heater core in the vehicle air conditioner.

Preferably, in the water discharge mode, when the amount of air passing through the heater core is smaller than a predetermined value, the discharge-amount controlling means controls the water-amount adjustment unit such that the flow of water discharged from the heat storage tank becomes larger than that when the amount of air passing through the heater core is larger than the predetermined value. Therefore, it can effectively prevent the temperature of the water flowing into the heater core from being greatly reduced, and also prevent the air temperature from the heater core from being greatly decreased due to the low-temperature water discharged from the heat storage tank.

Alternatively, when air passes through the heater core, the heating capacity determining means determines that the necessary heating capacity is larger than the predetermined capacity, and the water discharge mode is stopped. On the other hand, when the amount of air passing through the heater core is substantially zero, the heating capacity determining means determines that the necessary heating capacity is smaller than the predetermined capacity, and the water discharge mode is performed. In this case, it can accurately prevent the water temperature flowing into the heater core from being reduced due to the low-temperature water discharge from the heat storage tank.

Further, in the water discharge mode, the flow amount of the water discharged from the heat storage tank is made larger as the water temperature flowing into the heater core becomes larger, or as the engine load becomes larger. Accordingly, the high-temperature water can be effectively stored within the heat storage tank in the water discharge mode (heat storage mode), while sufficient heating performance can be obtained in the heater core.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
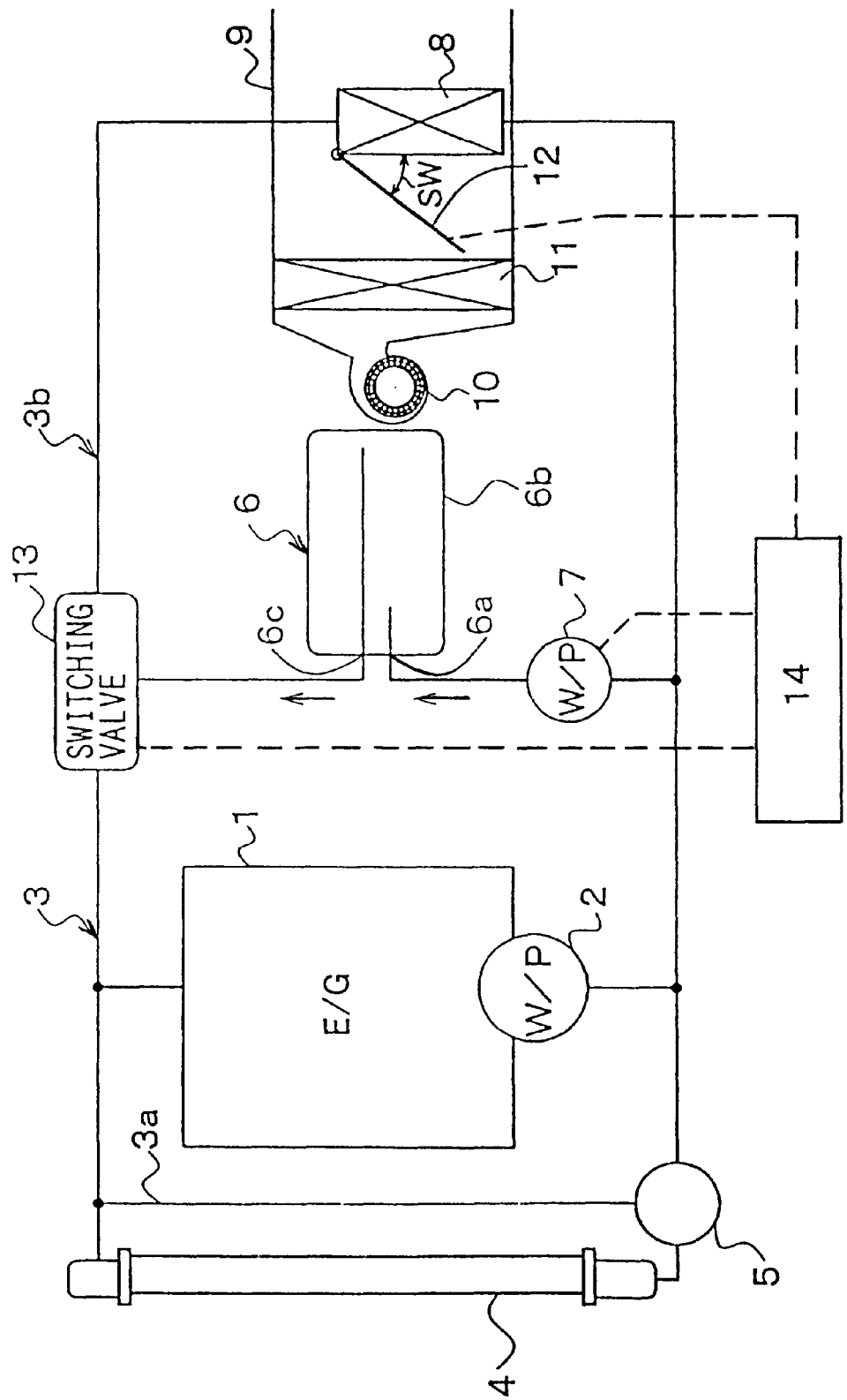
FIG. 1 is a schematic diagram of a vehicle air conditioner with a cooling water circuit of an engine, according to embodiments of the present invention.

A first embodiment of the present invention will be now described with reference to FIGS. 1–7. In the first embodiment, a cooling water circuit (engine-cooling water circuit) of a water-cooled engine is typically used for a vehicle air conditioner. As shown in FIG. 1, the engine 1 (i.e., internal combustion engine E/G) is for running a vehicle, and a first water pump 2 (W/P) is disposed to be operated by driving force from the engine 1. Cooling water (i.e., engine-cooling water, hot water) for cooling the engine 1 is circulated by the first water pump 2 in a cooling water circuit 3. Voltage V1 applied to the first water pump 2 can be controlled so that the amount of cooling water circulating in the cooling water circuit 3 can be controlled.

A radiator 4 is disposed in the cooling water circuit 3 to perform heat exchange between cooling water and outside air so that the cooling water passing through the radiator 4 is cooled. The cooling water circuit 3 has a bypass passage 3a through which cooling water flowing from the engine 1 bypasses the radiator 4 to be introduced toward a water inlet side of the engine 1. A thermostat 5 controls the temperature of the engine 1 by adjusting a flow amount of cooling water flowing through the bypass passage 3a and a flow amount of cooling water flowing through the radiator 4.

A heat storage tank 6 for storing the cooling water (hot water) is disposed in the cooling water circuit 3. The heat storage tank 6 includes an introduction port 6a for introducing cooling water from the cooling water circuit 3, a tank portion 6b having a double-tank structure for thermally-insulating and for storing the introduced cooling water, and a discharge port 6c for discharging the cooling water stored in the tank portion 6b to the cooling water circuit 3. Further, the heat storage tank 6 is disposed in the cooling water circuit 3 such that a flow of the cooling water is in parallel with the flow of cooling water in the engine 1 and the flow of cooling water in the heater core 8.

An electrical second water pump 7 (W/P) is disposed to circulate cooling water in the heat storage tank 6. In the first embodiment, by controlling the voltage (V2) applied to the second water pump 7, a water flow amount per unit time discharged from the heat storage tank 6 can be adjusted. Accordingly, the second water pump 7 constitutes a water-amount adjustment unit of the heat storage tank 6.

A heater core 8 is disposed to heat air to be blown into a passenger compartment using the cooling water (hot water) circulating in the cooling water circuit 3 as a heating source. Specifically, the heater core 8 is disposed in an air conditioning case 9 defining an air passage through which air flows into the passenger compartment. A blower 10 for blowing air into the passenger compartment is disposed in the air conditioning case 9 at an upstream air side in the air conditioning case 9. A cooling heat exchanger 11 for cooling air blown by the blower 10 is disposed in the air conditioning case 9 between the blower 10 and the heater core 8. For example, an evaporator of a vapor-compression refrigerant cycle can be used as the cooling heat exchanger 11.

An air mixing door 12 is disposed in the air conditioning case 9 between the cooling heat exchanger 11 and the heater core 8 to adjust a ratio between the air amount passing through the heater core 8 and the air amount bypassing the heater core 8. Therefore, the air mixing door 12 can adjust the temperature of air to be blown into the passenger compartment by adjusting the position of the air mixing door 12. The air mixing door 12 is operated by a servomotor, for example. Accordingly, the air mixing door 12 is used as a heating-amount adjustment unit for adjusting the heating amount for heating air passing through the heater core 8.

Figure 2:
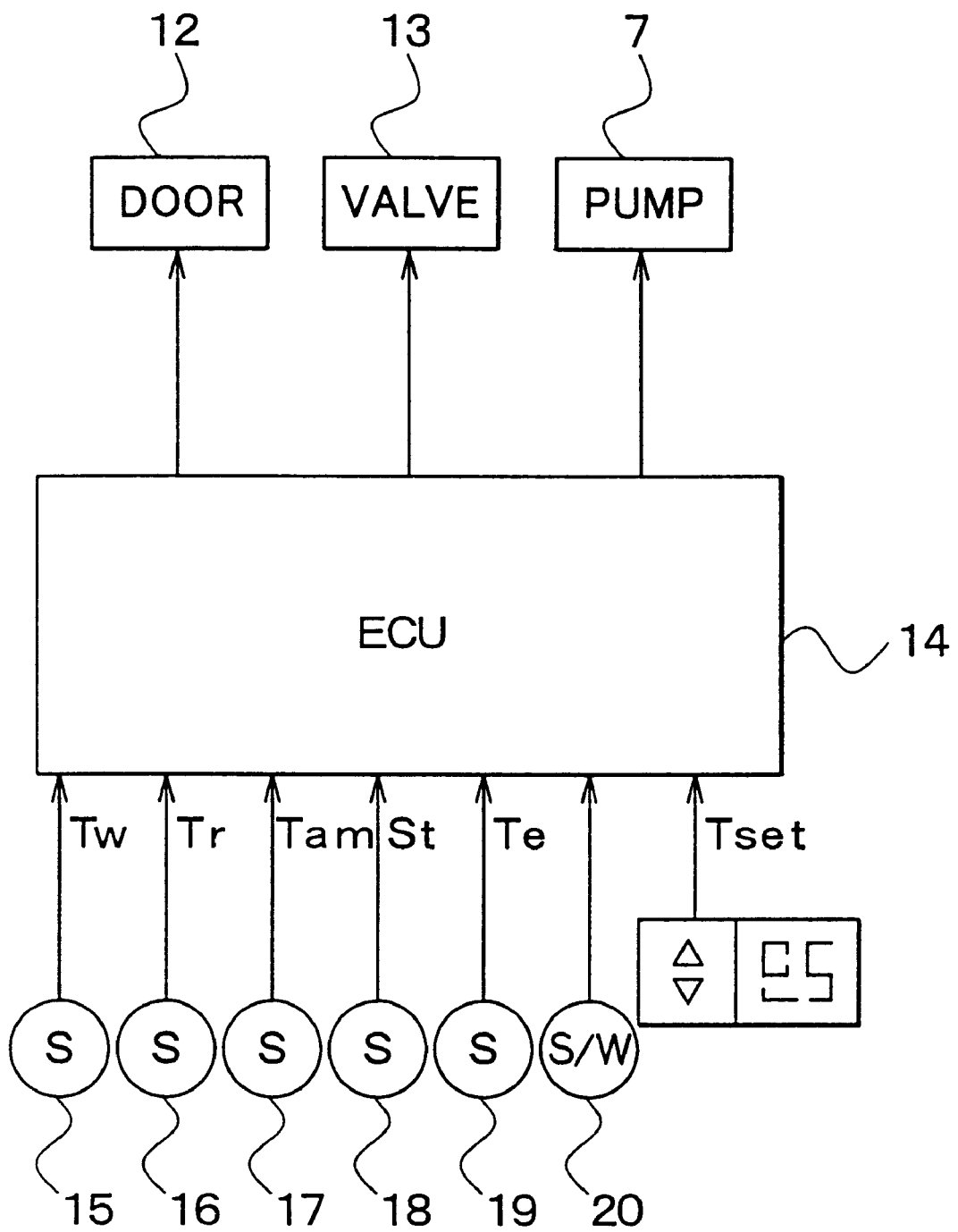
FIG. 2 is a block diagram showing control operation of an electronic control unit (ECU) of the air conditioner according to the embodiments of the present invention.

A switching valve 13 for switching water flow toward the heater core 8 is disposed in the cooling water circuit 3. The switching valve 13, the air mixing door 12 and the second water pump 7 are controlled by an electronic control unit (ECU) 14, as shown in FIG. 2. Sensor signals from a sensor group, and switch signals from switch members are input into the ECU 14. The sensor group includes a water temperature sensor 15 for detecting a water temperature Tw flowing from the engine 1, an inside air temperature sensor 16 for detecting an inside air temperature Tr within the passenger compartment, an outside air temperature sensor 17 for detecting an outside air temperature Tam outside the passenger compartment, a sunlight sensor 18 for detecting a solar radiation amount St entering the passenger compartment, and an evaporator air temperature sensor 19 for detecting an air temperature Te immediately after passing through the evaporator 11. Further, the switch members include a door switch 20 showing an opening/closing state of a vehicle door by a passenger, and a setting switch for setting a set temperature Tset set by a passenger in the passenger compartment. The ECU 14 controls each operation of the switching valve 13, the air mixing door 12 and the second water pump 7, based on the input signals of the ECU 14.

Next, operation of the vehicle air conditioner according to the first embodiment of the present invention will be described with reference to FIGS. 3 and 4. First, at step S10, it is determined whether or not the door switch 20 is opened. When the door switch 20 is opened once, it is determined that the driver gets into the vehicle for traveling in the vehicle. Output signals from the sensors 15–19 are read in the ECU 14 at step S20. However, in the first embodiment, the output signals from the sensors 15–19 can be read when an ignition switch is turned on.

Next, at step S30, it is determined whether or not the water temperature Tw detected by the water temperature sensor 15 is equal to or lower than a first predetermined temperature Tw1 (e.g., about 40° C.). When the water temperature Tw is equal to or lower than the first predetermined temperature Tw1, it is determined that the heating operation of the engine 1 needs to be performed. Then, at step S40, it is determined whether or not the engine 1 is stopped or running based on a rotation speed of the engine 1.

Figure 5:
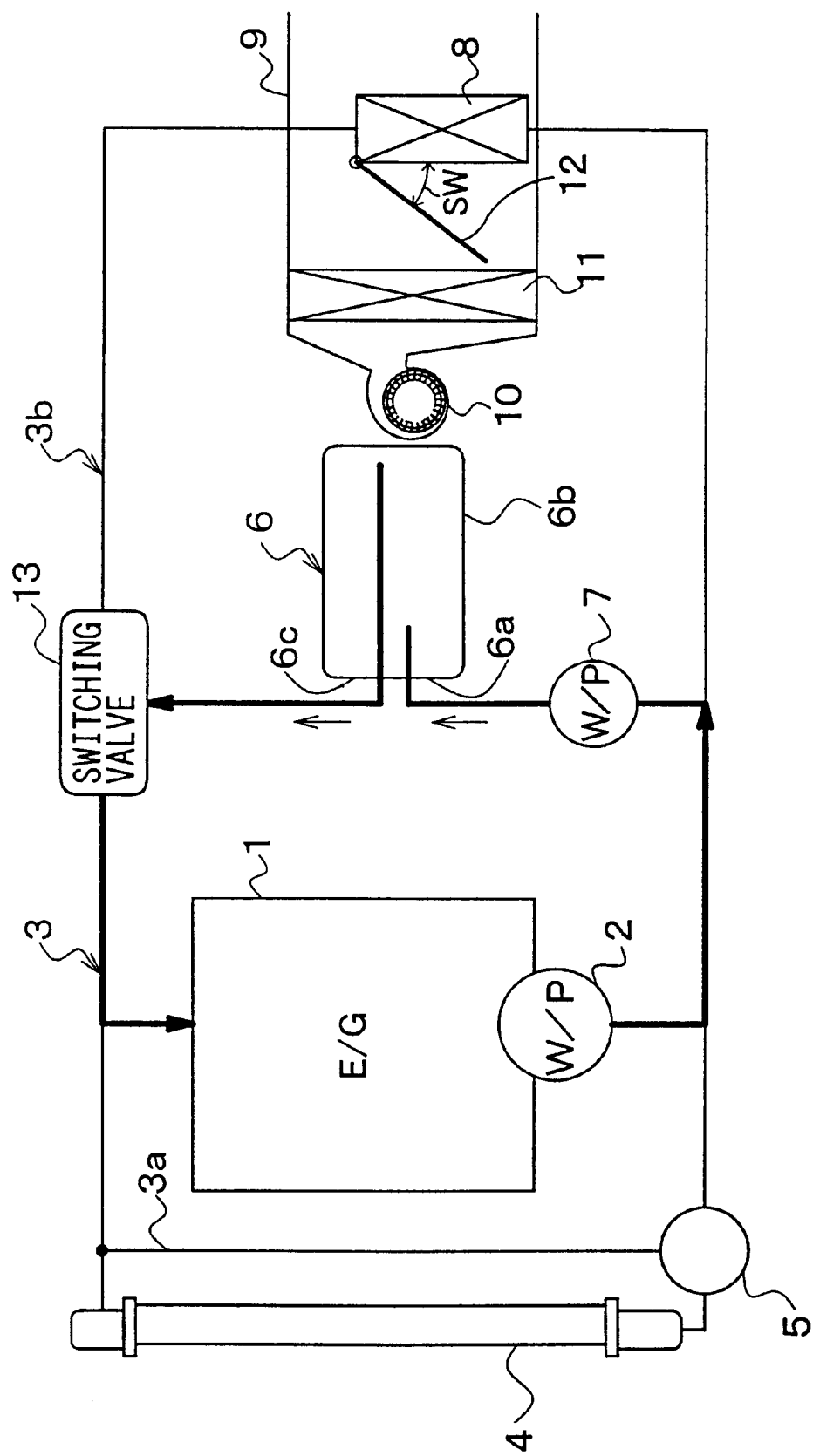
FIG. 5 is a schematic diagram showing the cooling water circuit in a preheat mode, according to the first embodiment.

When the engine 1 stops, the electrical switching valve 13 is operated to close a cooling water circuit 3b on the side of the heater core 8 for a predetermined time period t1, and voltage V2 applied to the second water pump 7 becomes maximum V(Hi), at steps S50–S80. In this case, as shown in FIG. 5, a preheat mode is set. In the preheat mode, the cooling water circulates through the heat storage tank 6, the engine 1 and the heat storage tank 6 in this order by the operation of the second water pump 7. Therefore, the engine 1 is heated by high-temperature cooling water (hot water) stored in the heat storage tank 6 and the heating time period for heating the engine 1 can be shortened. In the preheat mode, the cooling water flows opposite to the flow direction of the cooling water in the operation of the engine 1. Accordingly, the preheat mode cannot be performed while the engine 1 operates. Here, the predetermined time period t1 is a necessary time period for discharging all of the high-temperature cooling water stored in the heat storage tank 6 when the second water pump 7 is operated at the highest voltage V(Hi). When the second water pump 7 operates at the highest voltage V(Hi), the high-temperature cooling water stored in the heat storage tank 6 is discharged with the maximum flow amount. Further, in the preheat mode, the low-temperature cooling water staying in the engine 1 is introduced into the heat storage tank 6 to be held in the heat storage tank 6.

When the preheat mode is finished, or when the water temperature Tw is higher than the first predetermined temperature Tw1 or when the operation of the engine 1 is started, the second water pump 7 is stopped at step S80, and the switching valve 13 is operated so that the cooling water circuit 3b on the side of the heater core 8 is opened at step S90. When the water temperature Tw is higher than the first predetermined temperature Tw1, it is unnecessary to perform the preheat mode. On the other hand, when the engine 1 operates, it is impossible to perform the preheat mode.

Figure 6:
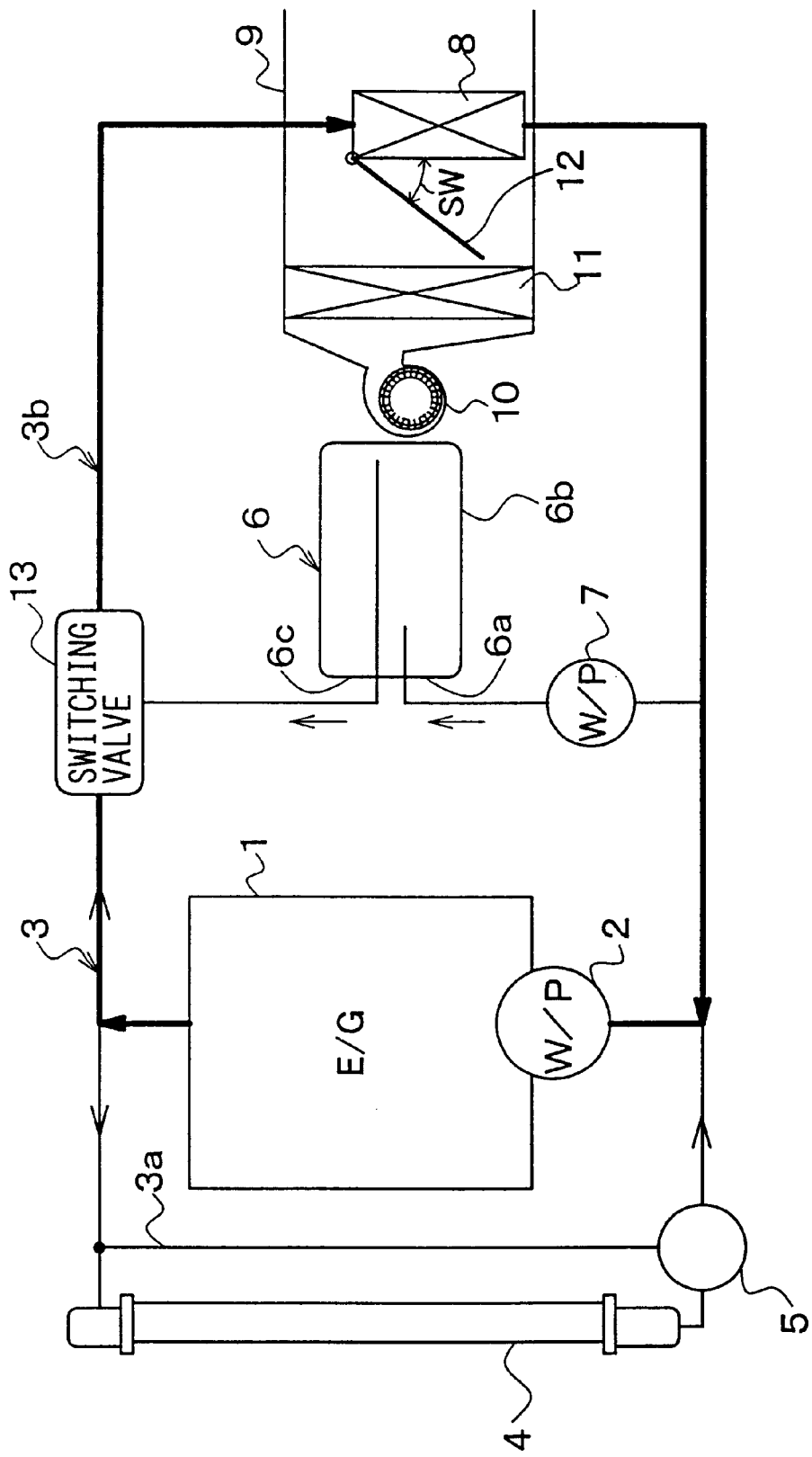
FIG. 6 is a schematic diagram showing the cooling water circuit in a general operation mode, according to the first embodiment.
Figure 7:
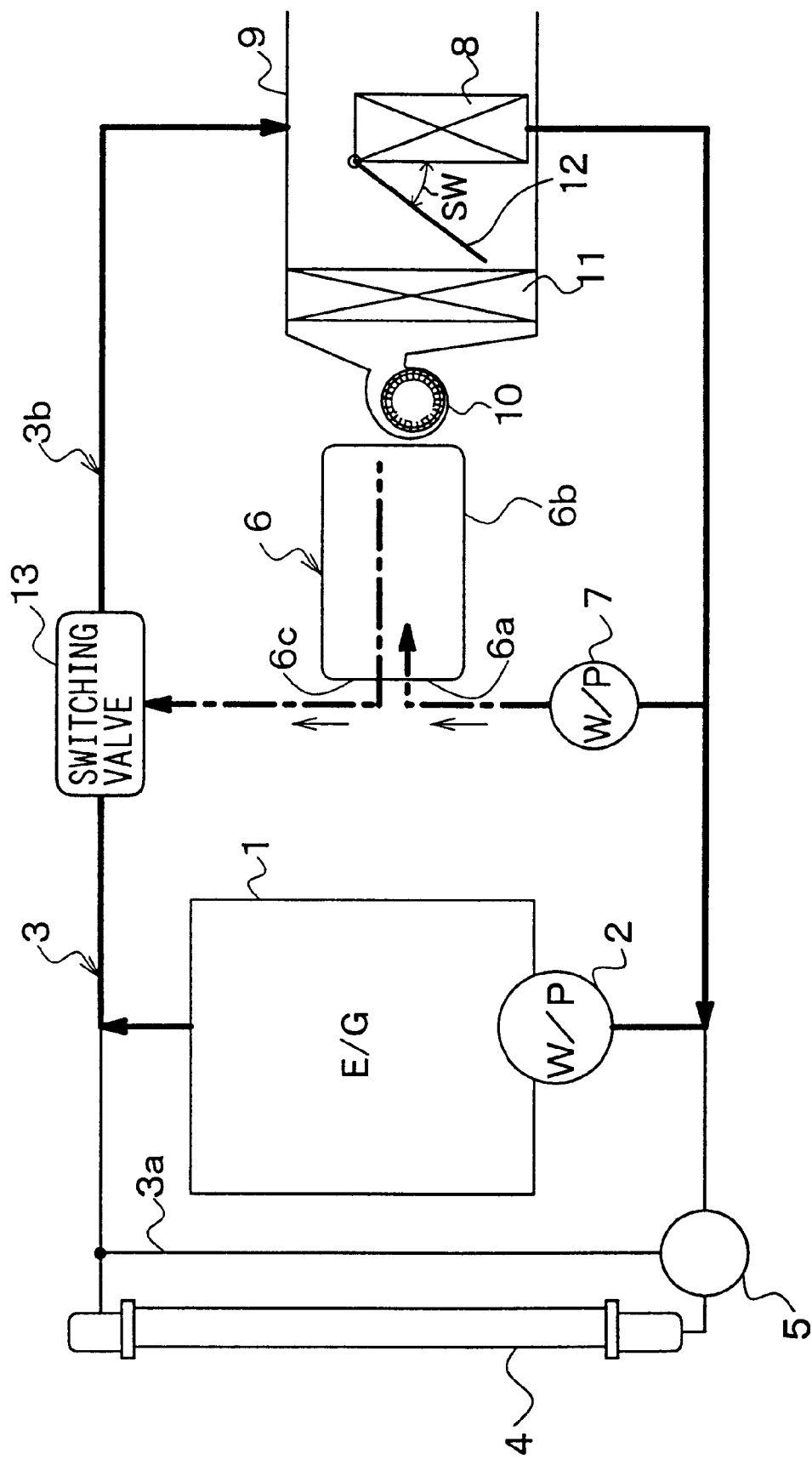
FIG. 7 is a schematic diagram showing the cooling water circuit in a heat-storage mode, according to the first embodiment.

When the engine 1 operates in this state, a general operation mode is set as shown in FIG. 6. The general operation mode includes the operation state after performing the preheat mode at step S90 in FIG. 3, and the other operation state of the engine 1. As shown in FIG. 6, in the general operation mode, the cooling water from the engine 1 is circulated to the side of the radiator 4 and the side of the heater core 8, by the operation of the first water pump 2. In the general operation mode after performing the preheat mode, while the low-temperature cooling water staying in the engine 1 is held within the heat storage tank 6, the cooling water circulates between the engine 1 and the heater core 8, and between the engine 1 and the radiator 4 including the bypass passage 3a. Accordingly, in the general operation mode after the preheat mode, a relative high-temperature water flows into the heater core 8, and heating capacity of the heater core 8 for heating air can be improved.

Figure 4:
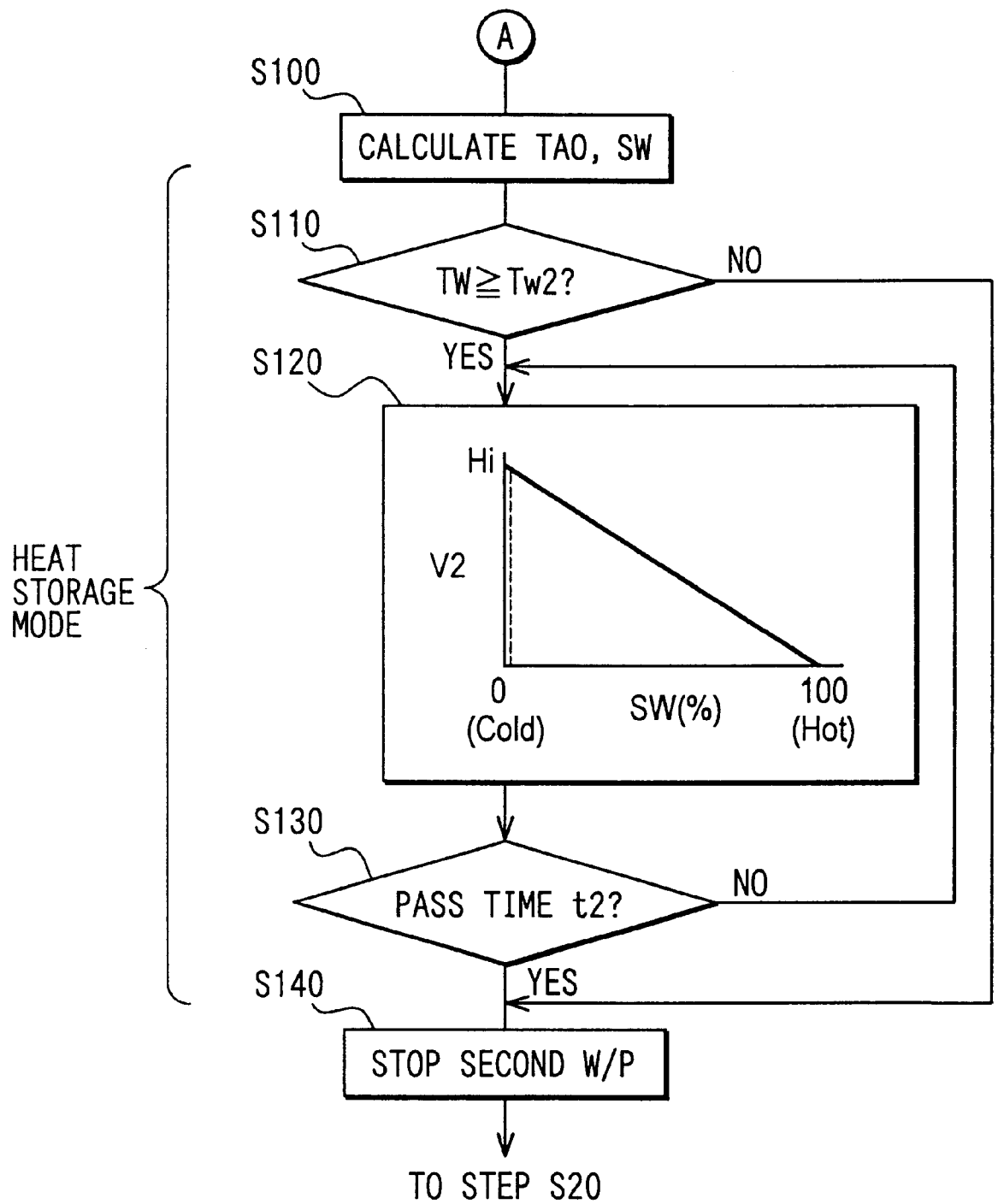
FIG. 4 is a flow diagram showing control processes of the air conditioner according to the first embodiment.

Next, as shown in FIG. 4, a target air temperature to be blown into the passenger compartment is calculated based on the output signals from the sensors 15–19, and a target opening degree SW of the air mixing door 12 is determined, at step S100. Thereafter, it is determined whether or not the temperature of the cooling water Tw is equal to or higher than a second predetermined temperature Tw2 which is higher than the first predetermined temperature Tw1.

Specifically, the target air temperature TAO is calculated based on the following formula (1).

$$TAO = Kset \times Tset - Kr \times Tr - Kam \times Tam - Ks \times Ts + C \quad (1)$$

wherein, Kset, Kr, Kam, Ks are control gains, and C is a control constant.

Further, the opening degree SW of the air mixing door 12 is calculated based on the following formula (2).

$$SW = [(TAO - Te)/(Tw - Te)] \times 100 (\%) \quad (2)$$

Here, as the opening degree SW (%) of the air mixing door 12 becomes larger, the air amount passing through the heater core 8 becomes larger. At steps S100–S140, the voltage V2 to be applied to the second water pump 7 is reduced in proportion to the increase of the opening degree SW (%) of the air mixing door 12 for a predetermined time period t2, so that the cooling water amount discharged from the heat storage tank 6 becomes smaller. For example, at step S120, as the opening degree SW (%) of the air mixing door 12 becomes larger, the voltage V2 applied to the second water pump 7 is reduced. The opening degree SW of the air mixing door 12 can be readily determined by the ECU 14 using signals from a potentiometer in a servomotor of the air mixing door 12. Therefore, a program within the ECU 14, for determining the opening degree SW, constitutes heating-capacity determining means for determining a necessary heating capacity for heating air by the heater core 8. Accordingly, the necessary heating capacity of the heater core 8 can be determined using the opening degree SW of the air mixing door 12.

Accordingly, in a heat storage mode (i.e., water discharge mode), the low-temperature cooling water held in the heat storage tank 6 in the preheat mode flows into the cooling water circuit 3b on the side of the heater core 8, and a relative high-temperature cooling water flowing out from the heater core 8 flows into the heat storage tank 6. Therefore, the relative high-temperature cooling water is stored in the heat storage tank 6 in the heat storage mode. That is, the heat storage mode is performed by water-discharge control means constituted by steps S100–S140. In the heat storage mode, the rotation speed of the second water pump 7 is decreased as the opening degree SW of the air mixing door 12 is increased, so that the cooling water amount discharged from the heat storage tank 6 is decreased.

The predetermined time period t2 at step S130 is a time period necessary for changing all of the low-temperature cooling water within the heat storage tank 6. In the first embodiment, the predetermined time period t2 is set for changing all of the low-temperature cooling water in the heat storage tank 6 when the voltage V2 applied to the second water pump 7 is set at a minimum.

According to the first embodiment of the present invention, in the heat storage mode (i.e., water discharge mode), as the opening degree SW of the air mixing door 12 becomes larger, that is, as the amount of air passing through the heater core 8 becomes larger, the rotation speed of the second water pump 7 is controlled so that the cooling water amount discharged from the heat storage tank 6 becomes smaller. Therefore, as the opening degree SW of the air mixing door 12 becomes larger and the necessary heating capacity of the heater core 8 for heating air becomes larger, the flow amount of the low-temperature cooling water discharged from the heat storage tank 6, stored in the preheat mode, becomes smaller. On the other hand, as the opening degree SW of the air mixing door 12 becomes smaller and the necessary heating capacity of the heater core 8 for heating air becomes smaller, the flow amount of the low-temperature cooling water discharged from the heat storage tank 6 toward the heater core 8 becomes larger.

Thus, in the heat storage mode (water discharge mode), it can restrict the temperature of the cooling water flowing into the heater core 8 from being greatly reduced, and can restrict the air temperature from the heater core 8 from being greatly reduced.

If the cooling water amount discharged from the heat storage tank 6 is controlled at a small constant flow amount without being dependant on the opening degree SW of the air mixing door 12 in the heat storage mode, the heating capacity of the heater core 8 is not greatly changed. However, in this case, the time period necessary for changing all the cooling water in the heat storage tank 6 becomes longer.

According to the first embodiment, when a large heating capacity is unnecessary in the heater core 8, that is, when the opening degree SW of the air mixing door 12 is small, the flow amount of the low-temperature cooling water discharged from the heat storage tank 6 is increased. Therefore, the cooling water can be changed in the heat storage tank 6 in a short time while it can prevent the heating capacity of the heater core 8 from being insufficient.

Figure 3:
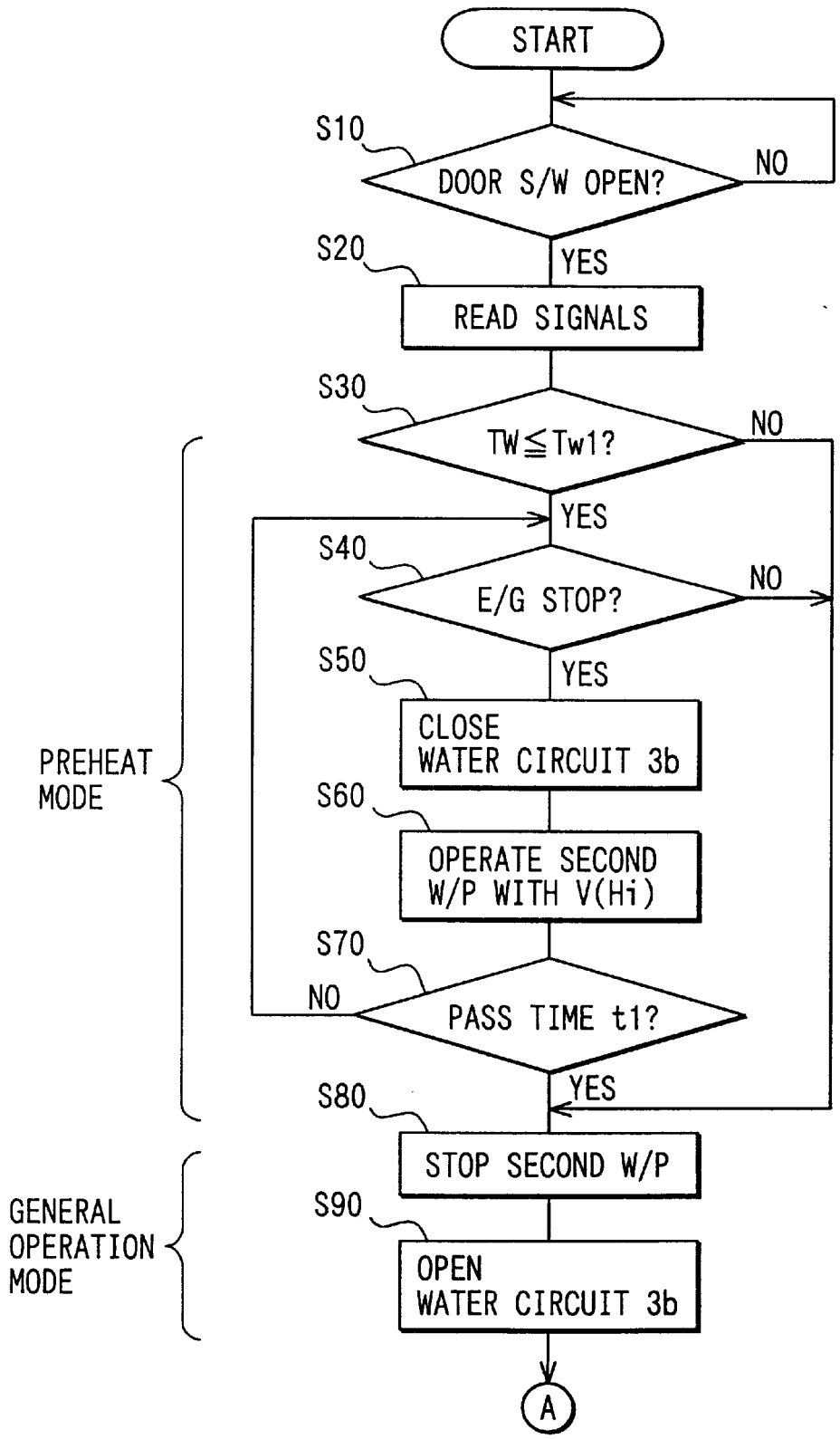
FIG. 3 is a flow diagram showing control processes of the air conditioner according to a first embodiment of the present invention.

In the first embodiment of the present invention, the preheat mode, the general operation mode and the heat storage mode (water discharge mode) are continuously performed as shown in FIGS. 3 and 4 in accordance with control programs in the ECU 14. However, those modes can be performed by other ways. For example, only the preheat mode and the general operation mode are continuously performed while electrical power from a battery is supplied, in accordance with a control flow diagram. In this case, the heat storage mode (i.e., water discharge mode) can be performed only when the engine 1 operates, and when the cooling water temperature Tw is equal to or higher than a third predetermined temperature Tw3 higher than the second predetermined temperature Tw2. Alternatively, the heat storage mode (water discharge mode) can be performed only when the engine 1 operates, when the cooling water temperature Tw is equal to or higher than a third predetermined temperature Tw3 higher than the second predetermined temperature Tw2, and when the cooling water temperature Tw in the heat storage tank 6 is lower than the first predetermined temperature Tw1.

Figure 8:
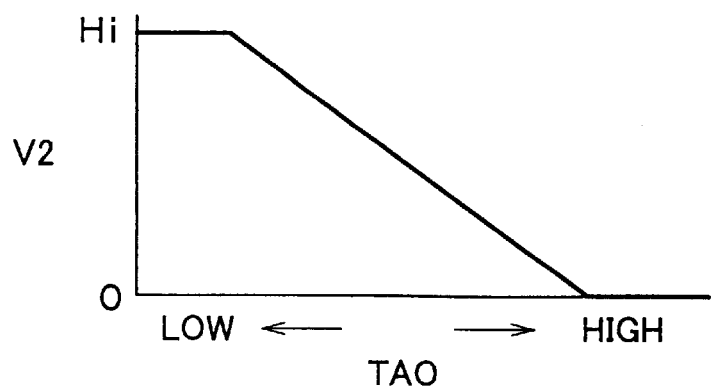
FIG. 8 is a graph showing a relationship between a voltage (V2) applied to a second water pump and a target air temperature (TAO), according to a second embodiment of the present invention.

A second embodiment of the present invention will be now described with reference to FIG. 8. In the above-described first embodiment of the present invention, the voltage V2 applied to the second water pump 7 is controlled as shown the graph at step S120 in FIG. 4, so that the flow amount of the cooling water discharged from the heat storage tank 6 becomes smaller as the opening degree SW of the air mixing door 12 becomes larger, in the heat storage mode (i.e., water discharge mode). The opening degree SW of the air mixing door 12 becomes larger as the target air temperature TAO becomes higher. Accordingly, in the second embodiment, as shown in FIG. 8, within a predetermined temperature range of the target air temperature TAO, the second water pump 7 is controlled so that the voltage V2 applied to the second water pump 7 is set lower as the target air temperature TAO becomes linearly higher. Accordingly, the flow amount of the cooling water discharged from the heat storage tank 6 becomes smaller linearly as the target air temperature TAO becomes higher, in the heat storage mode. Even in the second embodiment, the same advantage described in the first embodiment can be obtained.

Figure 9:
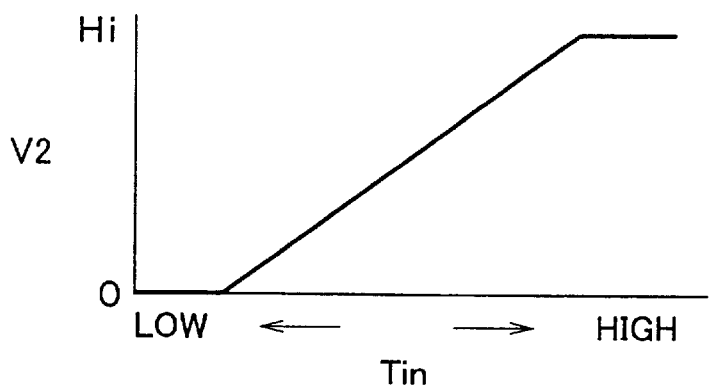
FIG. 9 is a graph showing a relationship between the voltage (V2) applied to the second water pump and a water temperature (Tin) flowing into a heater core, according to a third embodiment of the present invention.

A third preferred embodiment of the present invention will be now described with reference to FIG. 9. In the third embodiment, as shown in FIG. 9, within a predetermined temperature range of the cooling water temperature Tin flowing into the heater core 8 in the heat storage mode, the second water pump 7 is controlled so that the voltage V2 applied to the second water pump 7 is increased linearly as the cooling water temperature Tin flowing into the heater core 8 becomes higher. Therefore, the flow amount of the cooling water discharged from the heat storage tank 6 becomes larger linearly as the cooling water temperature Tin flowing into the heater core 8 becomes higher.

Accordingly, when the water temperature Tin flowing into the heater core 8 is low, the flow amount of the cooling water discharged from the heat storage tank 6 becomes smaller. Thus, in the heat storage mode, it can effectively prevent the temperature of the cooling water flowing into the heater core 8 from being greatly reduced, and it can restrict the heating capacity of the heater core 8 from being insufficient.

Figure 10:
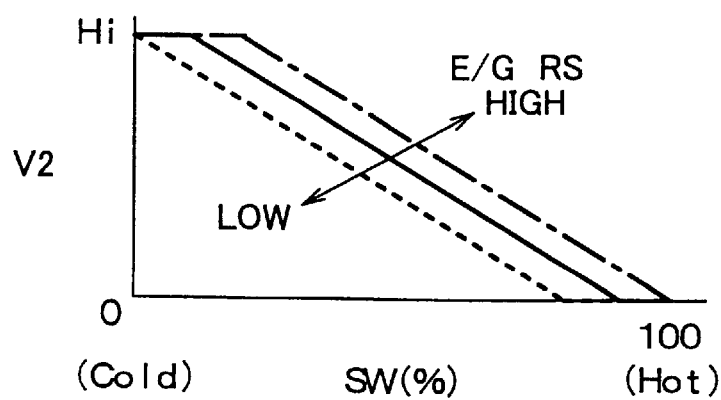
FIG. 10 is a graph showing a relationship between the voltage (V2) applied to the second water pump, an opening degree (SW) of an air mixing door and an engine rotation speed (E/G RS), according to a fourth embodiment of the present invention.
Figure 11:
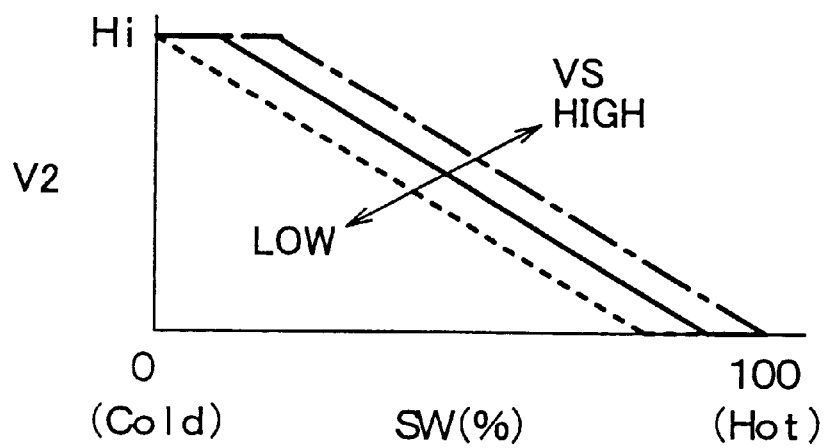
FIG. 11 is a graph showing a relationship between the voltage (V2) applied to the second water pump, the opening degree (SW) of the air mixing door and a vehicle speed (VP), according to the fourth embodiment.

A fourth embodiment of the present invention will be now described with reference to FIGS. 10 and 11. In the above-described first embodiment of the present invention, the voltage V2 applied to the second water pump 7 is determined only by using the opening degree SW of the air mixing door 12 in the heat storage mode. However, in the fourth embodiment, the voltage V2 applied to the second water pump 7 is determined by using the opening degree SW of the air mixing door 12 and the load of the engine 1, as shown in FIGS. 10 and 11. Generally, as the load of the engine 1 becomes higher, the engine rotation speed (E/G RS) becomes higher, and the temperature Tw of the cooling water flowing out from the engine 1 is increased. Accordingly, as shown in FIG. 10, as the rotation speed (RS) of the engine 1 becomes higher, the voltage V2 applied to the second water pump 7 becomes higher relative to the same opening degree SW of the air mixing door 12. That is, as the rotation speed (RS) of the engine 1 becomes higher, it can determined that the heating capacity of the heater core 8 for heating air is sufficient, and the flow amount of the cooling water discharged from the heat storage tank 6 can be increased.

Similarly, as shown in FIG. 11, as a vehicle speed SP becomes higher, the voltage V2 applied to the second water pump 7 becomes higher relative to the same opening degree SW of the air mixing door 12.

In the fourth embodiment, for determining the voltage V2 applied to the second water pump 7, the engine rotation speed (E/G RS) or the vehicle speed VS is used in combination with the opening degree SW of air mixing door 12 described in the first embodiment. However, instead of the opening degree SW of the air mixing door 12, the target air temperature TAO or the cooling water temperature Tin flowing into the heater core 8 described in the second and third embodiment can be used. That is, the voltage V2 applied to the second water pump 7 can be determined using the target air temperature TAO or the cooling water temperature Tin flowing into the heater core 8 while considering the engine load such as the engine rotation speed (E/G RS) and the vehicle speed (VS).

In the fourth embodiment, the engine rotation speed (E/G RP) or the vehicle speed (VS) is used as a parameter of the engine load. However, a suction negative pressure of the engine 1 or a vehicle acceleration degree (i.e., stepping amount of an acceleration pedal) can be used as the parameter of the engine load. In this case, the engine load can be detected based on the suction negative pressure of the engine 1 or the acceleration degree (i.e., stepping amount of an acceleration pedal).

Figure 12:
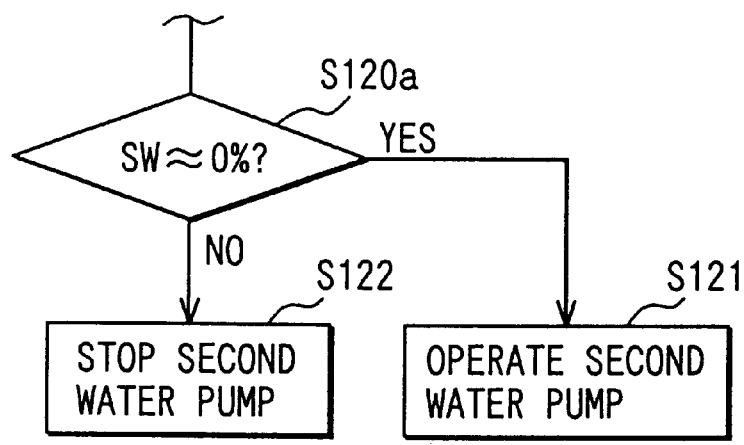
FIG. 12 is a flow diagram showing a part of control operation of the ECU, according to a fifth embodiment of the present invention.

A fifth embodiment of the present invention will be now described with reference to FIG. 12. In the above-described first embodiment, the voltage V2 applied to the second water pump 7 is controlled in accordance with the opening degree SW of the air mixing door 12. However, in the fifth embodiment, only when the opening degree SW of the air mixing door 12 is 0% or about 0% (i.e., SW≈0), the voltage V2 is applied to the second water pump 7 and the cooling water is discharged from the heat storage tank 6 in the heat storage mode. That is, as shown in FIG. 12, in the heat storage mode, when the target opening degree SW of the air mixing door 12 is equal to 0% or about 0% at step S120a, the second water pump 7 is operated at step S121. On the other hand, when the target opening degree SW of the air mixing door 12 is not equal to 0% or about 0% at step S120a, the second water pump 7 is stopped at step S122. When the target opening degree SW of the air mixing door 12 is equal to 0% or about 0%, the air amount passing through the heater core 8 becomes equal to or approximately equal to zero.

Although the present invention has been fully described in connection with the preferred embodiments thereof with reference to the accompanying drawings, it is to be noted that various changes and modifications will become apparent to those skilled in the art.

For example, in the above-described first through fourth embodiments of the present invention, the voltage V2 applied to the second water pump 7 is linearly continuously changed. However, the voltage V2 applied to the second water pump 7 can be non-linearly continuously changed, or can be changed stepwise (non-continuously). In the above-described embodiments of the present invention, the air mixing door 12 is automatically controlled by the ECU 14. However, the present invention can be applied to a vehicle air conditioner having a manually operated air mixing door 12. In this case, a detecting member for electrically or mechanically detecting the opening degree SW of the air mixing door 12 is included, and the cooling water amount flowing out from the heat storage tank 6 is adjusted based on signals from the detecting member.

In the above-described embodiments of the present invention, the cooling water amount flowing out from the heat storage tank 6 is adjusted by controlling the voltage V2 applied to the second water pump 7. However, the cooling water amount flowing out from the heat storage tank 6 can be adjusted by a flow adjustment valve driven by the second water pump 7, for example.

Further, in the above-described embodiments, the present invention is applied to a vehicle having the preheat mode for heating the engine 1 using high-temperature water stored in the heat storage tank 6. However, the present invention can be applied for a vehicle without having the above-described preheat mode. That is, the present invention can be applied to any vehicle having the heat storage tank 6.

Such changes and modifications are to be understood as being within the scope of the present invention as defined by the appended claims.

What is claimed is:

1. An air conditioner for a vehicle having an engine for driving the vehicle, the engine being cooled by water circulating in a water circuit, comprising:

a heater core, disposed in the water circuit, for heating air to be blown into a passenger compartment of the vehicle by using the water from the engine as a heating source;

a heating-amount adjustment unit adjusting a heating amount for heating air passing through the heater core;

a heat storage tank having an introduction port from which the water from the water circuit is introduced, a tank portion for thermally-insulating and storing the introduced water, and a discharge port for discharging the water stored in the tank portion into the water circuit;

a water-amount adjustment unit that adjusts a water amount discharged from the heat storage tank and introduced into the heat storage tank; and a control unit for controlling the heating-amount adjustment unit and the water-amount adjustment unit, the control unit including heating-capacity determining means for determining a necessary heating capacity for heating air by the heater core, and discharge-amount controlling means for controlling a flow amount of the water discharged from the heat storage tank, wherein:

when the heating-capacity determining means determines that the necessary heating capacity is smaller than a predetermined capacity in a water discharge mode for discharging the water from the heat storage tank toward the heater core, the discharge-amount controlling means controls the water-amount adjustment unit such that the flow amount of the water discharged from the heat storage tank becomes larger than that when the heating-capacity determining means determines that the necessary heating capacity is larger than the predetermined capacity.

2. The air conditioner according to claim 1, wherein:

the heating-amount adjustment unit is an air amount adjustment member adjusting an amount of air passing through the heater core;

the heating capacity determining means determines that the necessary heating capacity is larger as the of air passing through the heater core becomes larger, and the necessary heating capacity is smaller as the amount of air passing through the heater core becomes smaller; and in the water discharge mode, when the amount of air passing through the heater core is smaller than a predetermined value, the discharge-amount controlling means controls the water-amount adjustment unit such that the flow amount of the water discharged from the heat storage tank becomes larger than that when the amount of air passing through the heater core is larger than the predetermined value.

3. The air conditioner according to claim 2, wherein:

in the water discharge mode, the discharge-amount controlling means controls the water-amount adjustment unit such that the flow amount of the water discharged from the heat storage tank becomes larger as the of air passing through the heater core becomes smaller.

4. The air conditioner according to claim 1, wherein:

the heating-amount adjustment unit is an air amount adjustment member adjusting an amount of air passing through the heater core;

when air substantially passes through the heater core, the heating capacity determining means determines that the necessary heating capacity is larger than the predetermined capacity, and the water discharge mode is stopped; and when the amount of air passing through the heater core is substantially zero, the heating capacity determines means determines that the necessary heating capacity is smaller than the predetermined capacity, and the water discharge mode is performed.

5. The air conditioner according to claim 1, wherein:

the control unit includes calculation means for calculating a target temperature of air to be blown into the passenger compartment;

the heating capacity determining means determines that the necessary heating capacity becomes larger as the target temperature calculated by the calculation means becomes higher; and the heating capacity determines means determines that the necessary heating capacity becomes smaller as the target temperature calculated by the calculation means becomes lower.

6. The air conditioner according to claim 1, wherein:

the control unit includes a water temperature sensor for detecting a water temperature flowing into the heater core; and in the water discharge mode, the discharge-amount controlling means controls the water-amount adjustment unit such that the flow amount of the water discharged from the heat storage tank becomes larger as the water temperature detected by the water temperature sensor becomes higher.

7. The air conditioner according to claim 1, wherein:

the control unit includes engine-load determining means for determining an engine load applied to the engine; and in the water discharge mode, the discharge-amount controlling means controls the water-amount adjustment unit such that the flow amount of the water discharged from the heat storage tank becomes larger as the engine load becomes larger.

8. The air conditioner according to claim 1, wherein:

the control unit includes rotation-speed determining means for determining a rotation speed of the engine; and in the water discharge mode, the discharge-amount controlling means controls the water-amount adjustment unit such that the flow amount of the water discharged from the heat storage tank becomes larger as the rotation speed of the engine becomes larger.

9. The air conditioner according to claim 1, wherein:

the control unit includes vehicle-speed determining means for determining a vehicle speed; and in the water discharge mode, the discharge-amount controlling means controls the water-amount adjustment unit such that the flow amount of the water discharged from the heat storage tank becomes larger as the vehicle speed becomes higher.

10. The air conditioner according to claim 1, wherein:

the control unit includes a water temperature sensor for detecting a water temperature flowing out from the engine; and the water discharge mode is performed only when the water temperature is higher than a predetermined temperature.

11. The air conditioner according to claim 1, wherein:

the control unit includes a water temperature sensor for detecting a water temperature stored in the heat storage tank; and the water discharge mode is performed only when the water temperature stored in the heat storage tank is lower than a predetermined temperature.

12. The air conditioner according to claim 1, wherein:

in the water discharge mode, the discharge-amount controlling means controls the water-amount adjustment unit such that the flow amount of the water discharged from the heat storage tank becomes larger as the necessary heating capacity becomes smaller.

\* \* \* \* \*